US008566601B1

(12) United States Patent
Waters

(10) Patent No.: US 8,566,601 B1
(45) Date of Patent: Oct. 22, 2013

(54) SYSTEMS AND METHODS FOR FUNCTIONAL ENCRYPTION USING A STRING OF ARBITRARY LENGTH

(75) Inventor: Brent Waters, Austin, TX (US)

(73) Assignee: Zeutro LLC, Austin, TX (US)

( * ) Notice: Subject to any disclaimer, the term of this patent is extended or adjusted under 35 U.S.C. 154(b) by 0 days.

(21) Appl. No.: 13/610,864

(22) Filed: Sep. 12, 2012

(51) Int. Cl.
*H04L 9/30* (2006.01)
(52) U.S. Cl.
USPC .............................. 713/182; 713/150; 380/30
(58) Field of Classification Search
USPC .................................. 713/182, 150; 380/281
See application file for complete search history.

(56) References Cited

U.S. PATENT DOCUMENTS

| 5,677,956 | A | * | 10/1997 | Lafe ................................. 380/28 |
| 6,760,842 | B1 | * | 7/2004 | Miller et al. ..................... 726/26 |
| 6,836,765 | B1 | * | 12/2004 | Sussman ......................... 705/75 |
| 7,003,117 | B2 | | 2/2006 | Kacker et al. |
| 7,017,181 | B2 | * | 3/2006 | Spies et al. ........................ 726/3 |
| 7,580,521 | B1 | | 8/2009 | Spies et al. |
| 7,590,236 | B1 | | 9/2009 | Boneh |
| 7,634,085 | B1 | * | 12/2009 | Sahai et al. ..................... 380/28 |
| 7,949,683 | B2 | * | 5/2011 | Goyal ........................... 707/798 |
| 8,023,646 | B2 | | 9/2011 | Boyen |
| 8,230,559 | B2 | * | 7/2012 | Fildan et al. ..................... 24/303 |
| 8,320,559 | B1 | * | 11/2012 | Boneh et al. ..................... 380/30 |
| 2006/0167915 | A1 | * | 7/2006 | Furlong et al. ................ 707/101 |
| 2008/0046757 | A1 | | 2/2008 | Staddon et al. |
| 2009/0080658 | A1 | * | 3/2009 | Waters et al. ................. 380/277 |
| 2010/0185861 | A1 | | 7/2010 | Chase et al. |

FOREIGN PATENT DOCUMENTS

EP 2 464 051 A1 6/2012

OTHER PUBLICATIONS

Michel Abdalla, Mihir Bellare, Dario Catalano, Eike Kiltz, Tadayoshi Kohno, Tanja Lange, John Malone-Lee, Gregory Neven, Pascal Paillier, and Haixia Shi. Searchable encryption revisited: Consistency properties, relation to anonymous IBE and extensions. J. Cryptology, 21(3):350-391, 2008.
Shweta Agrawal, Dan Boneh, and Xavier Boyen. Ellcient lattice (H)IBE in the standard model. In Eurocrypt, pp. 553-572, 2010.
Shweta Agrawal, Dan Boneh, and Xavier Boyen. Lattice basis delegation in fixed dimension and shorter-ciphertext hierarchical IBE. In CRYPTO, pp. 98-115, 2010.
John Bethencourt, Amit Sahai, and Brent Waters. Ciphertext-policy attribute-based encryption. In IEEE Symposium on Security and Privacy, pp. 321-334, 2007.
Dan Boneh and Xavier Boyen. Efficient selective-id secure identity-based encryption without random oracles. In Eurocrypt, pp. 223-238, 2004.
Dan Boneh and Xavier Boyen. Secure identity based encryption without random oracles. In CRYPTO, pp. 443-459, 2004.

(Continued)

*Primary Examiner* — Jung Kim
*Assistant Examiner* — Thomas Ho
(74) *Attorney, Agent, or Firm* — CipherLaw

(57) ABSTRACT

Systems and methods for functional encryption systems that support regular languages and, thereby strings of arbitrary length, are provided. The disclosed systems and methods can encrypt data using public parameters and an arbitrary string. The arbitrary string can be included within the ciphertext as plaintext. A decryption key is generated that includes a representation of a regular language. The encrypted message can be decrypted only if the arbitrary string in the ciphertext is in the set of strings that comprise the regular language associated with the decryption key being used.

30 Claims, 10 Drawing Sheets

(56) References Cited

OTHER PUBLICATIONS

Dan Boneh, Xavier Boyen, and Eu-Jin Goh. Hierarchical identity based encryption with constant size ciphertext. In Eurocrypt, pp. 440-456, 2005.

Dan Boneh, Giovanni Di Crescenzo, Rafail Ostrovsky, and Giuseppe Persiano. Public key encryption with keyword search. In Eurocrypt, pp. 506-522, 2004.

Dan Boneh and Matthew K. Franklin. Identity-based encryption from the Weil pairing. SIAM J. Comput., 32 (3):586-615, 2003.

Dan Boneh and Mike Hamburg. Generalized identity-based and broadcast encryption schemes. In Proc. of Asiacrypt, pp. 455-470, 2008.

Dan Boneh, Amit Sahai, and Brent Waters. Functional encryption: Definitions and challenges. In TCC, pp. 253-273, 2011.

Dan Boneh and Brent Waters. Conjunctive, subset, and range queries on encrypted data. In TCC, pp. 535-554, 2007.

David Cash, Dennis Hofheinz, Eike Kiltz, and Chris Peikert. Bonsai trees, or how to delegate a lattice basis. In Eurocrypt, pp. 523-552, 2010.

Clifford Cocks. An identity based encryption scheme based on quadratic residues. In IMA Int. Conf., pp. 360-363, 2001.

Craig Gentry. Practical identity-based encryption without random oracles. In Eurocrypt, pp. 445-464, 2006.

Craig Gentry, Chris Peikert, and Vinod Vaikuntanathan. Trapdoors for hard lattices and new cryptographic constructions. In STOC, pp. 197-206, 2008.

Vipul Goyal, Abhishek Jain, Omkant Pandey, and Amit Sahai. Bounded ciphertext policy attribute based encryption. In ICALP (2), pp. 579-591, 2008.

Vipul Goyal, Omkant Pandey, Amit Sahai, and Brent Waters. Attribute-based encryption for fine-grained access control of encrypted data. In ACM Conference on Computer and Communications Security, pp. 89-98, 2006.

Mike Hamburg. Spatial encryption. IACR Cryptology ePrint Archive, 2011:389, 2011.

Vincenzo Iovino and Giuseppe Persiano. Hidden-vector encryption with groups of prime order. In Pairing, pp. 75-88, 2008.

Jonathan Katz, Amit Sahai, and Brent Waters. Predicate encryption supporting disjunctions, polynomial equations, and inner products. In Eurocrypt, pp. 146-162, 2008.

Allison B. Lewko, Tatsuaki Okamoto, Amit Sahai, Katsuyuki Takashima, and Brent Waters. Fully secure functional encryption: Attribute-based encryption and (hierarchical) inner product encryption. In Eurocrypt, pp. 62-91, 2010.

Tatsuaki Okamoto and Katsuyuki Takashima. Hierarchical predicate encryption for innerproducts. In ASIACRYPT, pp. 214-231, 2009.

Tatsuaki Okamoto and Katsuyuki Takashima. Fully secure functional encryption with general relations from the decisional linear assumption. In CRYPTO, pp. 191-208, 2010.

Amit Sahai and Brent Waters. Fuzzy identity-based encryption. In Eurocrypt, pp. 457-473, 2005.

Adi Shamir. Identity-based cryptosystems and signature schemes. In CRYPTO, pp. 47-53, 1984.

Brent Waters. Efficient identity-based encryption without random oracles. In Eurocrypt, pp. 114-127, 2005.

Brent Waters. Dual system encryption: Realizing fully secure IBE and HIBE under simple assumptions. In CRYPTO, pp. 619-636, 2009.

Brent Waters. Ciphertext-policy attribute-based encryption: An expressive, efficient, and provably secure realization. PKC, 2011.

RFC 5408, Identity-Based Encryption Architecture and Supporting Data Structures, Jan. 2009.

Nishanth Chandran, Melissa Chase, and Vinod Vaikuntanathan. Functional Re-encryption and Collusion-Resistant Obfuscation. In TCC 2012, 404-421, 2012.

Craig Gentry. Computing Arbitrary Functions of Encrypted Data. Communications of the ACM, Mar. 2010, vol. 53, No. 3, pp. 97-105.

Allison Lewko and Brent Waters. Unbounded HIBE and Attribute-Based Encryption. Eurocrypt 2011, pp. 547-567.

Allison Lewko and Brent Waters. Decentralizing Attribute-Based Encryption. Eurocrypt 2011, pp. 568-588.

Tatsuaki Okamoto and Katsuyuki Takashima. Adaptively Attribute-Hiding (Hierarchical) Inner Product Encryption. Eurocrypt 2012, pp. 591-608.

\* cited by examiner

SYSTEMS AND METHODS FOR FUNCTIONAL ENCRYPTION USING A STRING OF ARBITRARY LENGTH

REFERENCE TO GOVERNMENT FUNDING

This invention was made with Government support under award number 0952692 awarded by the National Science Foundation. The Government has certain rights in this invention.

FIELD OF THE INVENTION

The present invention relates generally to functional encryption systems that support regular languages, and more particularly, to functional encryption systems where an encryptor uses a string of arbitrary length.

BACKGROUND OF THE INVENTION

Prior to the invention of public key cryptography, two parties that wished to communicate securely over an unsecured network needed to first establish a mutual secret out of band. While this might be acceptable for small organizations, such solutions are clearly infeasible in today's Internet with billions of users.

The concept of public key cryptography radically changed secure communication. In public key cryptography, two parties can securely communicate with each other without having an a priori mutual secret. Knowing only a party's globally shared public key, a user can verify that a message was sent by the party (using digital signatures) and confidentially encrypt a message to the intended party (using public key encryption).

Public key cryptography opened a floodgate of applications and the use of public key cryptography has become ubiquitous. Almost all major software vendors can now distribute software updates and security patches over the Internet. For example, digital signatures are a critical tool for enforcing that an update is from the legitimate vendor and not malware. Web browsers use public key encryption (via SSL) to send confidential information (e.g., credit card numbers, passwords, etc.) over the web to online services and modern email readers can send and receive encrypted email.

In this model, encryption is traditionally viewed as a mechanism for a user, Alice, to confidentially encode data to a target recipient, Bob. Alice encrypts the data under the recipient's public key such that only Bob, with knowledge of his private key, can decrypt it.

However, in some applications, it is desirable to share data according to an encryption policy without prior knowledge of who will be receiving the data. Functional encryption enables this. Suppose an informant needs to encrypt a message for anyone in a police department's internal affairs office or anyone who is undercover and in the central office—even though the informant may not know which officers satisfy these conditions. The informant will want to encrypt the message according to some other parameters, rather than to a specific individual. Using functional encryption, instead of encrypting data to a particular user, an encryptor can encrypt data under the public parameters of a system. To accomplish this, users in the system can obtain a secret key (issued from an authority) that is associated with a value k. What a user learns about the data depends on the system's functionality and their key value k.

An example functional encryption system is known as Attribute-Based Encryption (ABE). In a (Key-Policy) ABE system, a key is associated with a single boolean formula $\phi$ and a ciphertext is associated with a pair of a message m and variables $\vec{x}$. A user can decrypt and learn m if and only if $\vec{x}$ satisfies the formula $\phi$. In those systems, the formula $\phi$ only operates over a fixed and predetermined number of variables (i.e., a bounded description from the ciphertext). This restriction on fixed size inputs is not limited to Attribute-Based Encryption; other functional encryption systems such as Spatial Encryption or Inner Product Encryption are also limited to fixed size inputs.

DETAILED DESCRIPTION

Figure 1:
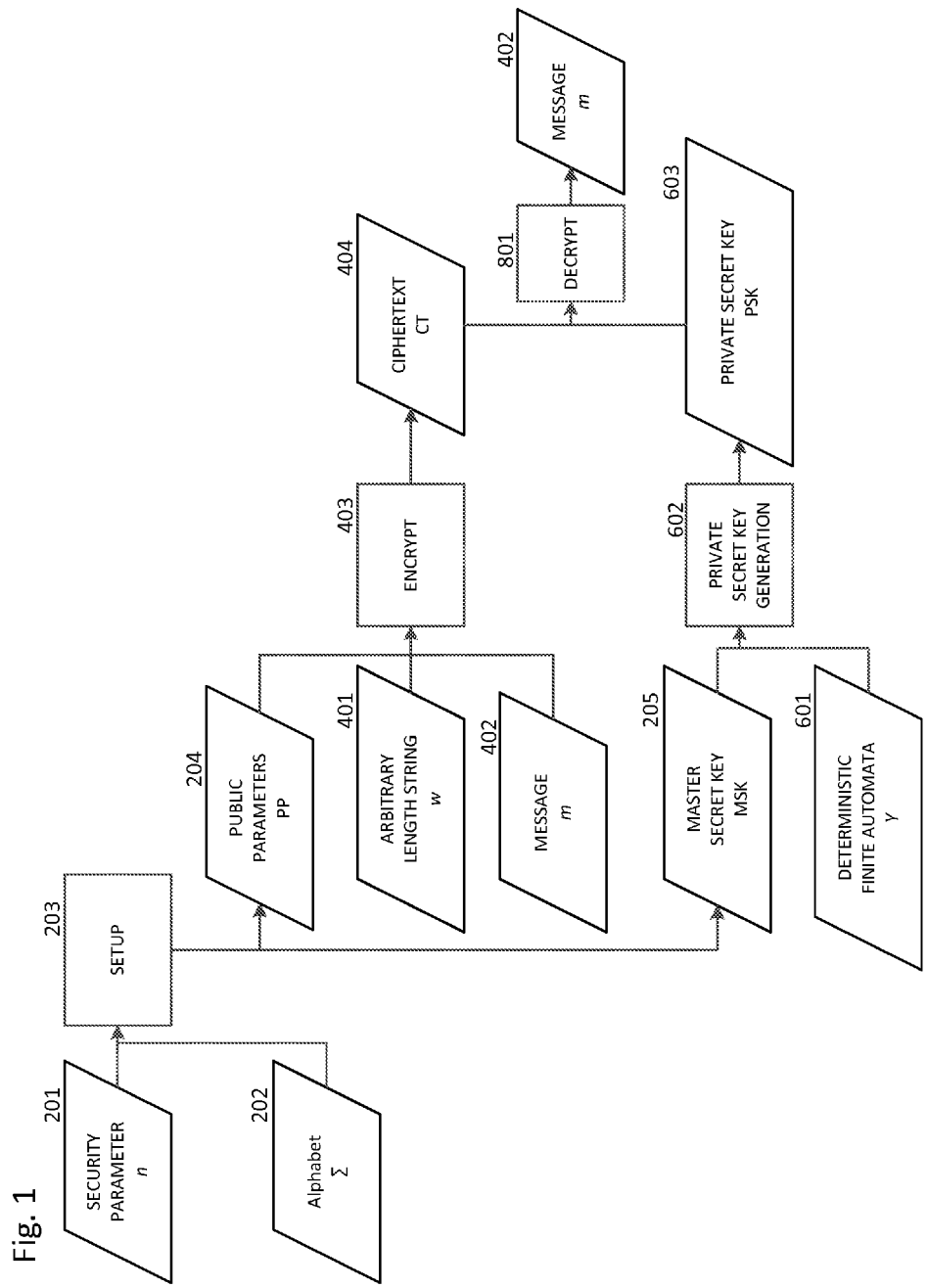
FIG. 1 illustrates an example overview of a method for functional encryption.

In the following description of embodiments, reference is made to the accompanying drawings which form a part hereof, and in which it is shown by way of illustration specific embodiments of claimed subject matter. It is to be understood that other embodiments may be used, for example, and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The setup, encryption, private secret key generation, and decryption procedures could also be executed in different orders. As a non-limiting example, the private secret key generation procedure could be performed before or after message encryption. Additionally, various computations that are described below, such as those within the setup, encryption, private secret key generation, and decryption modules, need not be performed in the order disclosed and other embodiments using alternative orderings of the computations could be readily implemented. In addition to being reordered, the computations could also be decomposed into sub-computations with the same or substantially the same results.

There are many applications where it would be desirable to expand the types of data associated with the key beyond just a single boolean formula. In particular, it would be beneficial to enable association of keys and strings of any arbitrary size.

The ability to require and check for the presence of certain arbitrary data before allowing decryption has a wide range of applications. For example, in network logging applications, an encryption input could represent an arbitrary number of events logged. Another example is an encryption of a database of patient data that includes disease history paired with gene sequences where the number of participants is not a priori bounded or known.

The systems and methods described herein are additionally generally applicable to the class of applications where there is a family of documents that has a public (i.e., not hidden) template along with some secret data that fits within that template. For example, tax returns may be arbitrarily long and have a template that consists of a plaintext identification of fields for deductions claimed and encrypted private data containing the amount of these deductions. An auditor might be authorized to read the encrypted data of a return if the plaintext identification fields for the deduction matches a certain pattern. As another example, a virus scanner for email communications could be able to take a deeper look into portions of an email that match a certain pattern, but have some content remain encrypted otherwise.

The string processor described herein can perform various pattern matching functions. For example, a private secret key may be able to decrypt only the portions of network logs where the header string matches a certain pattern. These features of patterns and expressions can be represented as a deterministic finite automata which is provided to the setup routine, as described below.

Functional encryption using arbitrary length strings is also useful in a variety of environments where there are multiple sources of data, such as video and databases that can be of arbitrary length. For example, functional encryption could be used to check for the presence of substrings or check the parity of data without revealing the private content in the payload.

Arbitrary-Sized Input Strings

The systems and methods described herein can support regular languages and thereby operate over arbitrary size inputs. The systems and methods described herein are capable of recognizing an unbounded language. While the existing (Key-Policy) Attribute-Based Encryption (ABE) methods employed a private secret key associated with a single boolean formula which operated over a fixed number of boolean variables from the ciphertext, the systems and methods disclosed herein using a deterministic finite automata can operate over an arbitrary length input w.

As described in more detail below, a private secret key can be associated with a deterministic finite automata (DFA). A ciphertext CT can include an encryption of message m and a plaintext copy of an arbitrary length string w. A user is able to decrypt the ciphertext CT if and only if a DFA (or other pattern acceptor) associated with the private secret key accepts the string w. As used herein, both the message m and string w can be any arbitrary data. As non-limiting examples, the data could include email messages, files, documents, streaming content, or any other form of information capable of being stored in or transported through a computing device. The message m and string w can also be any alphanumeric combination. As described herein, in addition to representing a literal string, the string w can also be used to encode any pattern capable of representation by a regular expression. In some hybrid embodiments, the systems and methods described herein can be used to encrypt a symmetric key (e.g., an AES key) which is then used to perform bulk encryption of other data. In those embodiments, the message m to be encrypted could be simply the AES key. The content of string w may be identified by a user or may be identified to the system by an automated process.

In some embodiments, the plaintext string can be identified by an automatic process that derives the string from the data to be encrypted or from meta-data associated with the data to be encrypted. As a non-limiting example, an automatic process could be configured to evaluate a document which encodes information on a particular individual named "John Smith" and would obtain the string "John Smith" by parsing the document contents. As an additional non-limiting example, an automated processor could be configured to evaluate the nature of the data being encrypted, e.g., "radiological record" or "satellite imagery" to derive the string used for encryption.

The systems and methods described herein can be considered to be public index systems in so far as the encryption of message m is not decipherable without a private secret key for decryption, but the arbitrary string w can be determined without resorting to using a private secret key for decryption. Thus, while the string w may be considered to be part of the ciphertext, it is not necessarily encrypted and may be stored as a plaintext string.

In some embodiments, the systems and methods described herein can use bilinear groups. Bilinear groups are algebraic groups associated with an efficiently-computable "bilinear map," as defined below.

Let $\mathbb{G}_1$ and $\mathbb{G}_2$ be cyclic groups of prime order p, for which the group operation is denoted as multiplication. Let $g_1$ be a generator of $\mathbb{G}_1$ and $g_2$ be a generator of $\mathbb{G}_2$. Let $e: \mathbb{G}_1 \times \mathbb{G}_2 \rightarrow \mathbb{G}_T$, which takes one element in $\mathbb{G}_1$ and one element in $\mathbb{G}_2$ and outputs one element in $\mathbb{G}_T$, be a bilinear map with the properties:

1. Bilinearity: For all $u \in \mathbb{G}_1$, $v \in \mathbb{G}_2$ and $a,b \in \mathbb{Z}_p$, it holds that $e(u^a, v^b) = e(u,v)^{ab}$.

2. Non-degeneracy: If $g_1$ generates $\mathbb{G}_1$ and $g_2$ generates $\mathbb{G}_2$, then $e(g_1, g_2) \neq 1$.

3. Efficiently Computable: The mapping e as well as the group operations in $\mathbb{G}_1$ and $\mathbb{G}_2$ are all efficiently computable.

$\mathbb{G}_1$ and $\mathbb{G}_2$ are not necessarily distinct groups. When the groups are distinct, it is considered to be an asymmetric bilinear setting. When the groups are the same (up to efficiently computable isomorphisms), it is considered to be a symmetric bilinear setting.

The order of these groups might also be composite. The systems and methods described herein can be applied in any of these types of bilinear groups as well as in other algebraic settings including, as non-limiting examples, RSA (Rivest, Shamir and Adleman), discrete logarithm, elliptic curve, lattices, knapsacks or multivariate settings.

The systems and methods described herein are provably secure in the selective model under a variant of the Decision Bilinear Diffie-Hellman Exponent (BDHE) assumption. They can also be adaptively secure in the generic group model. The generic group model was defined in Victor Shoup, "Lower bounds for discrete logarithms and related problems," *EUROCRYPT*, pgs. 256-266, 1997. The generic group model captures attacks for which the attacker performs group operations, but it does not leverage the specific structure of the algebraic group. Thus, those embodiments are adaptively secure under the assumption that there does not exist a non-generic attack against them.

Deterministic Finite-State Automata

In order to implement a regular expression in software or hardware, a regular expression may be converted to a deterministic finite automata (DFA), which is a finite state machine that defines state transitions for processing a regular expression, where for each pair of current state and input symbol there is one and only one transition to a next state. Because a DFA includes only one possible transition for any combination of current state and input symbol, DFAs are desirable for implementation of regular expression functionality in software or hardware. The DFAs described herein can be used to evaluate an arbitrary input string according to a regular expression. The DFAs described herein may be of any number of states. As non-limiting examples, the number of states may be linearly or exponentially related to system parameters and variables associated with the string being evaluated.

The DFAs described herein may be effectively implemented using various different techniques which are substantially interchangeable. The DFA may be implemented as a hardware or software module. The DFA module can include a first memory controller, at least one DFA thread engine, and instruction input logic. A processor can submit DFA instructions to the DFA module through an instruction queue of the instruction input logic. As non-limiting examples, the DFA described herein could be implemented using a transition table or hard coding wherein the transition table is represented as programming language code. To the extent that the DFA is used to process a regular expression, it may be implemented as regular expression processor or any computerized program or module that either serves as a parser generator or examines an input string and identifies parts that match the specification provided by the regular expression.

As used herein, DFAs are described using generally accepted terminology and definitions from M. Sipser, *Introduction to the Theory of Computation*, Thomson Course Technology, 2006. Accordingly, a Deterministic Finite Automata Y is a 5-tuple $(Q,\Sigma,\delta,q_0,F)$ in which:
1. Q is a set of states
2. $\Sigma$ is a finite set of symbols called the alphabet
3. $\delta:Q\times\Sigma\rightarrow Q$ is a function known as a transition function
4. $q_0\in Q$ is called the start state
5. $F\subseteq Q$ is a set of accept states.

For convenience, the notation of $\mathcal{T}$ is added as the set of transitions associated with the function $\delta$, where $t=(x,y,\sigma)\in \mathcal{T}$ iff $\delta(x,\sigma)=y$.

Suppose that $Y=(Q,\Sigma,\delta,q_0,F)$. Then Y accepts a string $w=w_1, w_2, \ldots, w_i \in \Sigma^*$ if there exists a sequence of states $r_0, r_1, \ldots, r_n \in Q$ where:
1. $r_0=q_0$
2. For i=0 to n−1, the transition function is $\delta(r_i,w_{i+1})=r_{i+1}$
3. $r_n\in F$.

As used herein, the notation ACCEPT (Y, w) denotes that the machine Y accepts w and REJECT (Y, w) denotes that Y does not accept w. A DFA Y recognizes a language L if Y accepts all $w\in L$ and rejects all $w\notin L$; such a language is called regular. With reference to regular expressions, the DFA is said to accept the input string if the string matches the rule (e.g., pattern) defined by the regular expression.

System Modules

An encryption can be associated with a string w over a finite alphabet $\Sigma$. The ciphertext can represent and enforce the order of the symbols of w. Private secret keys can represent a DFA, such that a user is only able to decrypt when Y accepts w. The DFA-based encryption method described herein can include some or all of four modules: setup, encryption, private secret key generation, and decryption. The module descriptions and associated methods are described below. An overview of the modules and data flow between them is illustrated in FIG. 1, with further reference to the following description.

Setup ($1^n,\Sigma$)

Figure 2:
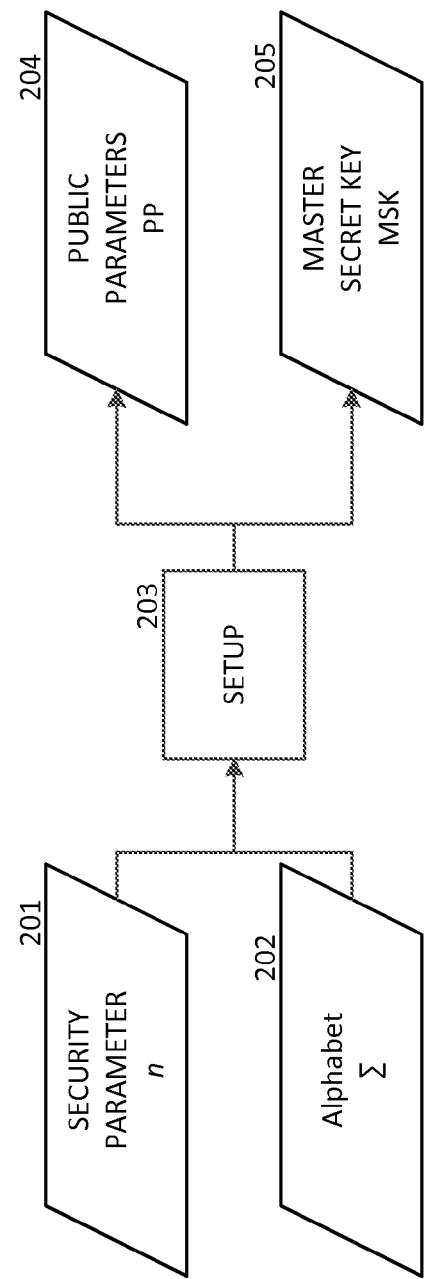
FIG. 2 illustrates an example data flow for a setup module.

An overview of the inputs and outputs for the setup module is illustrated in FIG. 2. The setup module takes as input the security parameter (201) and the description of a finite alphabet E (202). The alphabet can be any non-empty set of symbols or letters. As non-limiting examples, the alphabet could be any or all of characters ('A', 'B', 'C' . . . 'Z'), ('a', 'b', 'c' . . . 'z'), or digits, ('0', '1', '2', '3' . . . ), or any combination thereof. This alphabet can be used for strings and machine descriptions in the system. The alphabet can also be shared across the entire system. Setup module (203) outputs the public parameters PP (204) and a master secret key MSK (205).

Figure 3:
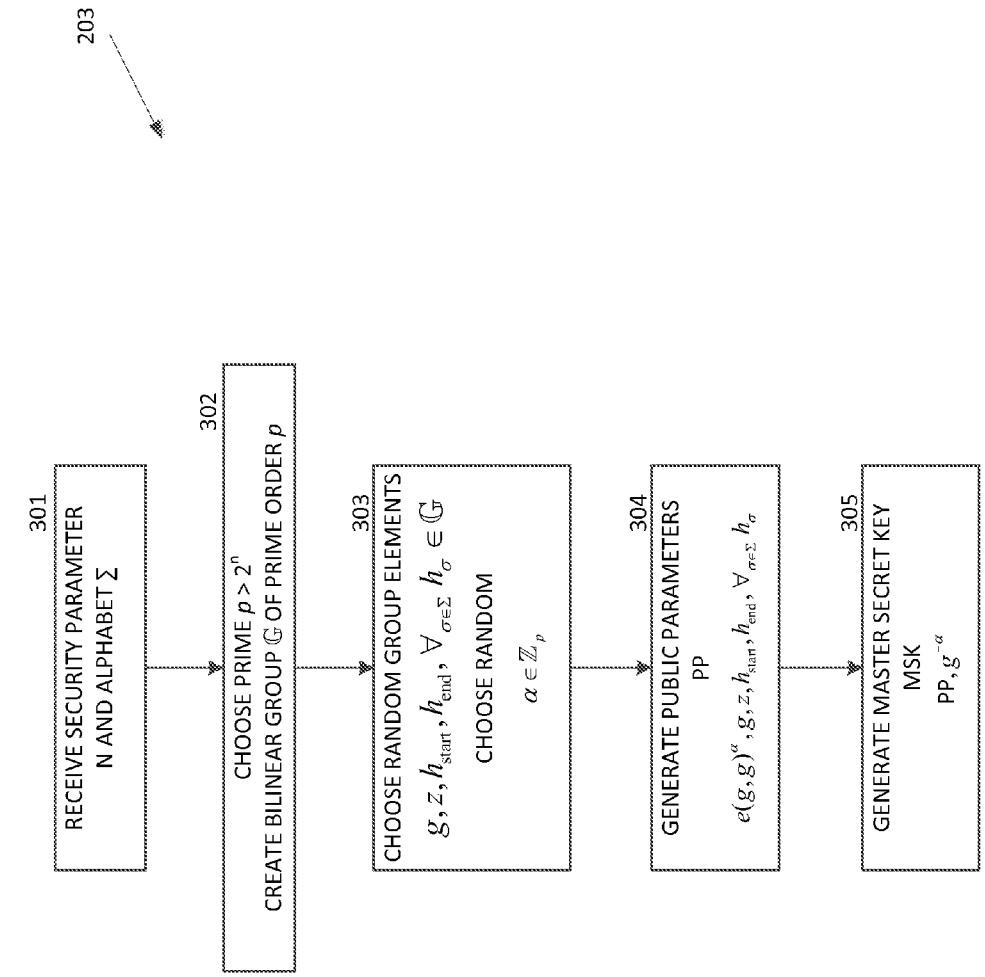
FIG. 3 illustrates an example method for generating a master secret key and public parameters.

An example setup method is described below and illustrated in the flow diagram presented in FIG. 3. In step (301), the setup method takes as input a security parameter n and an alphabet $\Sigma$. Security parameter n can be any positive integer. Typically, a larger n renders the system more secure, but at the expense of operational speed. As described below, security parameter n is used to choose the size of the bilinear group. A larger bilinear group typically requires more effort to attack and the system may require more time to perform group operations, exponentiations and pairings. In some embodiments, n is specified based on predetermined security or performance parameters. For example, the security parameter n can be selected so as to result in security equivalent to a symmetric, RSA, Diffie-Hellman or elliptic curve key of a certain size.

In step (302), a prime $p>2^n$ is chosen and a bilinear group $\mathbb{G}$ of prime order p is created. Prime p can be of any arbitrary size and can be randomly chosen. In some embodiments, the prime p can be selected to be large enough to ensure that the elliptic-curve discrete logarithm problem (ECDLP) cannot be solved in a reasonable amount of time. In bilinear groups, this may depend on the specific type of elliptic curve used, as these groups may be vulnerable to specific attacks that do not apply to other forms of elliptic curve groups. A preferred embodiment would use a Barreto-Naehrig curve with a 256-bit prime p. In step (303), the method then chooses random group elements g, z, $h_{start}$, $h_{end}$, $\forall_{\sigma\in\Sigma} h\sigma \in \mathbb{G}$.

In various embodiments, element g may or may not be a generator of the algebraic group $\mathbb{G}$. The h values may be selected to assist in creating a match between the DFA transitions used and the symbols in the strings. In particular, the h values may be randomly selected from a high entropy random source. $h_{start}$ can be used to enforce that decryption begins at the start state of the DFA and at the start of the string and not at any arbitrary state. $h_{end}$ can be used in a corresponding way to ensure that the last state is an accept state and that the string is at the end. Group element z can be used to enforce certain semantic conditions. Some or all of these group elements are used in both the encryption and private secret key generation steps, as described below.

An exponent $\alpha\in\mathbb{Z}_p$ is randomly chosen. Based on the random group elements, $e(g,g)^\alpha$ is computed using a bilinear map function. While the embodiments illustrated herein use symmetric bilinear groups, the systems and methods could be adapted to use asymmetric bilinear groups.

The master secret key MSK can include $g^{-\alpha}$ along with the public parameters. The public parameters can include some or all of the description of the group $\mathbb{G}$ and the alphabet $\Sigma$ along with:

$e(g,g)^\alpha$, g, z, $h_{start}$, $h_{end}$, $\forall_{\sigma\in\Sigma} h_\sigma$.

The setup method thereby generates public parameters (304), and, using the public parameters, the master secret key (305). During setup operations, the public parameters can be published so that they are available to any users in the system. Any suitable technique may be used to publish the public parameters. For example, the public parameters can be provided to users by one of the modules described herein, can be listed in a directory, can be exchanged between users in a peer-to-peer fashion, or can be published by placing them on a dedicated publicly-accessible public parameter server. The public parameters may or may not be digitally signed, depending on the embodiment.

Encryption (PP, w=$w_1, \ldots, w_l$, m)

Figure 4:
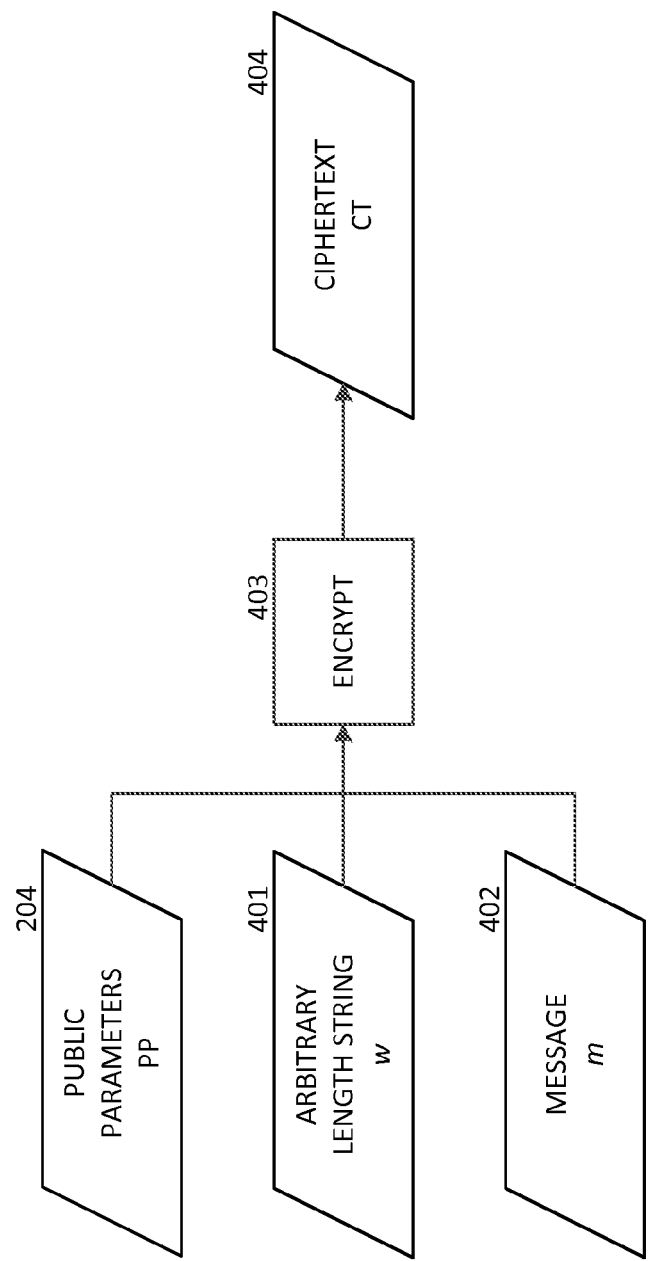
FIG. 4 illustrates an example data flow for an encryption module.

An overview of the inputs and outputs for the encryption module is illustrated in FIG. 4. The encryption module takes as input at least some of the public parameters PP (204), an arbitrary length string W∈Σ* of symbols (401), and a message m∈$\mathbb{G}_T$ (402). While some embodiments of the encryption module may use all of the public parameters generated by the setup module, other embodiments may use less than all of the public parameters. Encryption module (403) outputs a ciphertext CT (404) by a transformative operation. The methods and systems described herein can be configured to operate in the public index model and those embodiments do not require that string w be hidden or kept secret. In some embodiments, string w may be identified by a user and that identification provided to an encryption processor. In other embodiments, string w may be programmatically identified using regular expressions, pattern matching, or other efficient techniques. In some embodiments, string w may be contextually related to the message m or it may be unrelated to the message m.

Figure 5:
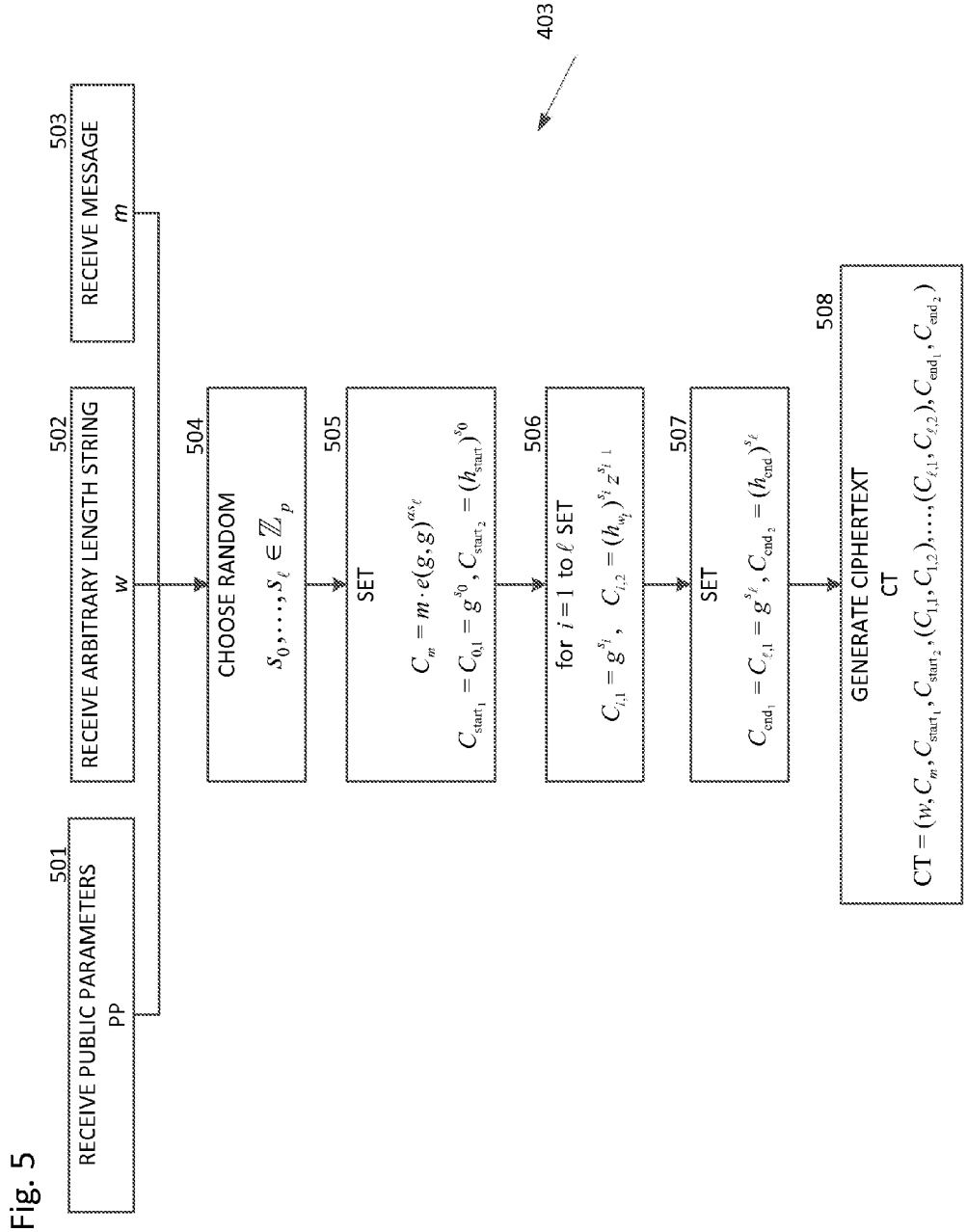
FIG. 5 illustrates an example method for generating a ciphertext.

An example encryption method is described below and illustrated in the flow diagram presented in FIG. 5. Let $w_i$ denote the i-th symbol of w and l denote the length of w. The encryption method chooses random $s_0, s_i \in \mathbb{Z}_p$ and creates the ciphertext as follows.

Based on at least some of the public parameters (501), the arbitrary length string (502), and the message (503), the method sets $$\text{Random } s_0, \ldots, s_l \in \mathbb{Z}_p. \quad (504)$$

(505) $C_m = m \cdot e(g,g)^{\alpha s_l}$ is calculated where the function $e(g,g)^{\alpha s_l}$ is as an example function for blinding the message. Other blinding functions could be used interchangeably.

$$C_{start_1} = C_{0,1} = g^{s_0}, C_{start_2} = (h_{start})^{s_0} \quad (505)$$

Then, for i=1 to l it sets $$C_{i,1} = g^{s_i}, C_{i,2} = (h_{w_i})^{s_i} z^{s_{i-1}}. \quad (506)$$

Finally, it sets $$C_{end_1} = C_{l,1} = g^{s_l}, C_{end_2} = (h_{end})^{s_l}. \quad (507)$$

The output ciphertext is $$CT = (w, C_m, C_{start_1}, C_{start_2}, (C_{1,1}, C_{1,2}), \ldots, (C_{l,1}, C_{l,2}), C_{end_1}, C_{end_2}) \quad (508)$$

In the example transformative operation described above, the string w may be appended to the encrypted message material. The string w may be appended either before or after the encrypted message material. In alternative embodiments, the string w may be stored separately from the encrypted message material and referenced by a physical or logical link. The combined string w and encrypted message material is considered to be the output ciphertext. In some embodiments, the output ciphertext may be associated with one or more meta-data elements including, as non-limiting examples, attributes such as the string or set of strings with which the output ciphertext is associated. These meta-data elements may, in some embodiments, be used by the decryption procedure. The associated meta-data may accompany the output ciphertext or be stored separately from the output ciphertext and referenced by a physical or logical link.

While the example embodiment described above is implemented using exponentiation as the transformative operation to encrypt the message, encryption could also be performed using various other suitable and interchangeable techniques. For example, the bilinear map construction of a particular identity-based encryption system was translated into a similar lattice-based identity-based encryption system as described in Cash, et al., "Bonsai Trees, or How to Delegate a Lattice Basis," *Advances in Cryptology—EUROCRYPT* 2010, 29th *Annual International Conference on the Theory and Applications of Cryptographic Techniques,* 2010.

Private Secret Key Generation (MSK,Y=(Q,$\mathcal{T}$,$q_0$,F))

Figure 6:
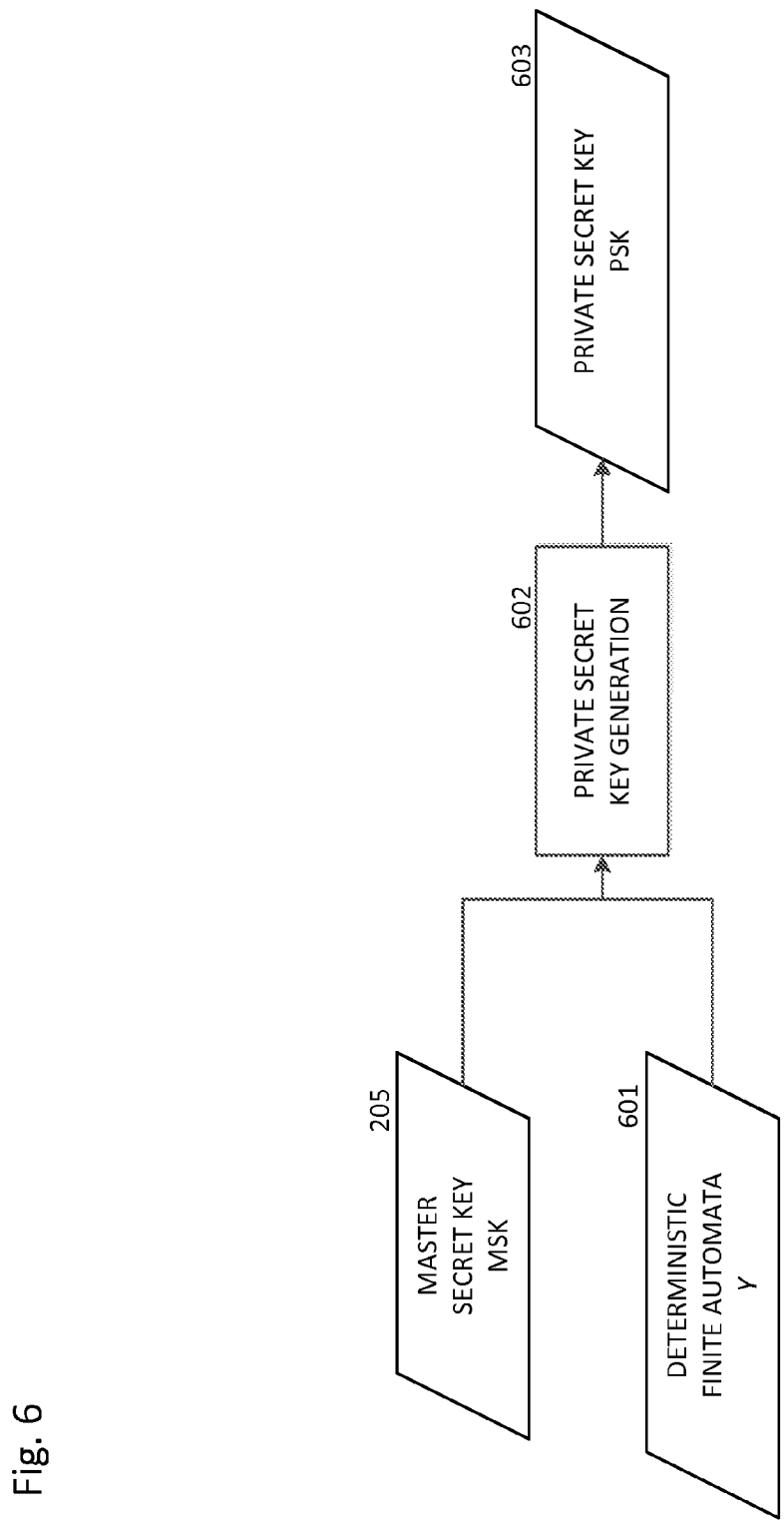
FIG. 6 illustrates an example data flow for a private secret key generation module.

An overview of the inputs and outputs for the encryption module is illustrated in FIG. 6. The private secret key generation module takes as input some or all of the elements of the master secret key MSK (205) in step 701 and a description of the deterministic finite state machine Y (601) in step 702. While some embodiments of the private secret key generation module may use all of the elements of the master secret key, other embodiments may use less than all of the elements of the master secret key. The description passed does not need to include the alphabet Σ since it is already determined by the setup method. (As discussed above, Σ may be provided in the parameters.) In addition, the transitions can be encoded as a set $\mathcal{T}$ of three tuples as described above. That is, the description of Y includes a set Q of states $q_0, \ldots q_{|Q|-1}$ and a set of transitions $\mathcal{T}$ where each transition t∈$\mathcal{T}$ is a 3-tuple (x,y,σ)∈Q×Q×Σ. In addition, $q_0$ is designated as a unique start state and F⊂Q is the set of accept states. The method executed by the private secret key generation module (602) outputs a private secret key PSK (603). The systems and methods described herein can be configured to operate using any arbitrary DFA having arbitrary states Q and transitions $\mathcal{T}$.

Figure 7:
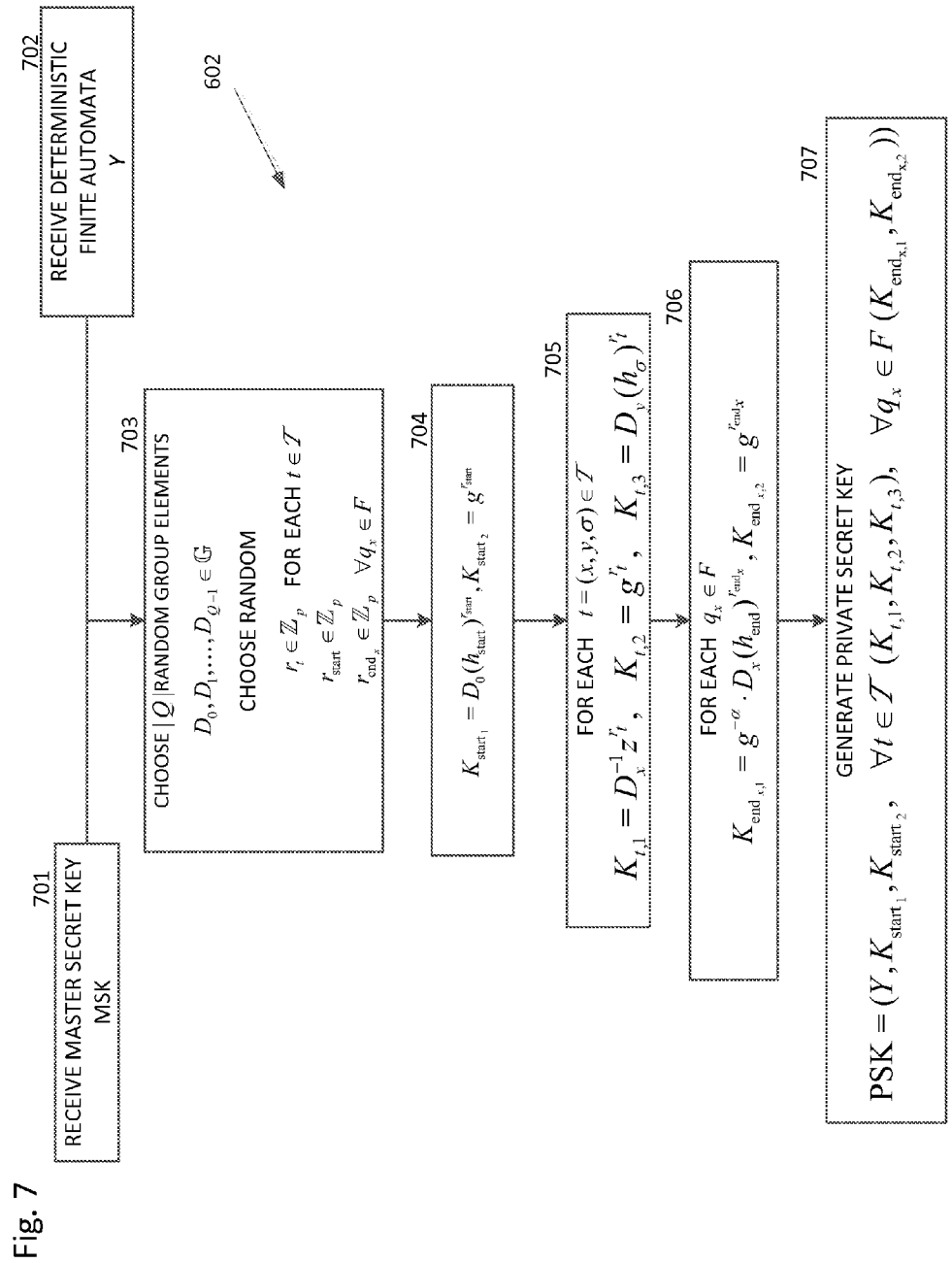
FIG. 7 illustrates an example method for generating a private secret key.

An example encryption method is described below and illustrated in the flow diagram presented in FIG. 7. The method starts in step (703) by choosing |Q| random group elements $D_0, D_1, \ldots, D_{|Q|-1} \in \mathbb{G}$, where $D_i$ is associated with state $q_i$. As such, the D values help represent the state of the method during decryption. Next, for each t∈$\mathcal{T}$ the method chooses random $r_t \in \mathbb{Z}_p$. It also chooses random $r_{start} \in \mathbb{Z}_p$ and $\forall q_x \in F$ it chooses random $r_{end} \in \mathbb{Z}_p$.

It begins creating the private secret key with $$K_{start_1} = D_0(h_{start})^{r_{start}}, K_{start_2} = g^{r_{start}} \quad (704)$$

For each t=(x,y,σ)∈$\mathcal{T}$, the method creates the private secret key components $$K_{t,1} = D_x^{-1} z^{r_t}, K_{t,2} = g^{r_t}, K_{t,3} = D_y(h_\sigma)^{r_t} \quad (705)$$

Finally, for each $q_x \in F$ it computes $$K_{end_{x,1}} = g^{-\alpha} \cdot D_x(h_{end})^{r_{end_x}}, K_{end_{x,2}} = g^{r_{end_x}} \quad (706)$$

The private secret key is then determined to be $$PSK = (Y, K_{start_1}, K_{start_2}, \forall t \in \mathcal{T} \ (K_{t,1}, K_{t,2}, K_{t,3}), \forall q_x \in F \ (K_{end_{x,1}}, K_{end_{x,2}})) \quad (707)$$

In the example described above, the description of the DFA Y may be appended to the private secret key material. The description Y may be appended either before or after the private secret key material. The combined description of DFA Y and private secret key material is considered to be the output private secret key for decryption. In alternative embodiments, the description of the DFA may be stored separately from the private secret key material and referenced by a physical or logical link. As a result, the description of the DFA is effectively incorporated into the private secret key for decryption. As discussed above, the DFA can be implemented, in some embodiments, as a regular expression. In those embodiments, the regular expression can be stored in the private secret key using any available methods for encoding and storing regular expressions.

In some embodiments, different DFAs could be used in different calls to the private secret key generation routine. For example, consider DFAs $Y_A$, $Y_B$ and three strings $w_C$, $w_D$, $w_E$. Further, suppose that $Y_A$ accepts $w_c$ and $W_D$, but not $W_E$ (i.e., ACCEPT($Y_A$, $w_C$)=ACCEPT($Y_A$, $w_D$)=true) and suppose that $Y_B$ only accepts $w_D$. Now suppose that the private secret key generation routine is called on $Y_A$ and then on $Y_B$ to produce respective private secret keys $SK_A$ and $SK_B$. Encryption is then called on strings $w_C$, $w_D$, $w_E$ to respectively produce $CT_C$, $CT_D$, $CT_E$. In that case, private secret key $SK_A$ could be used to decrypt $CT_C$ and $CT_D$, but not $CT_E$.

If only private secret key $SK_B$ is available, only $CT_D$ could be decrypted. This general principle can be generalized to an arbitrary number of ciphertexts and an arbitrary number of private secret keys. A private secret key can be associated with a particular DFA and, as a result, which ciphertexts the key can decrypt depend on whether the string associated with a particular ciphertext is accepted by the DFA associated with the key.

Decryption (SK, CT)

Figure 8:
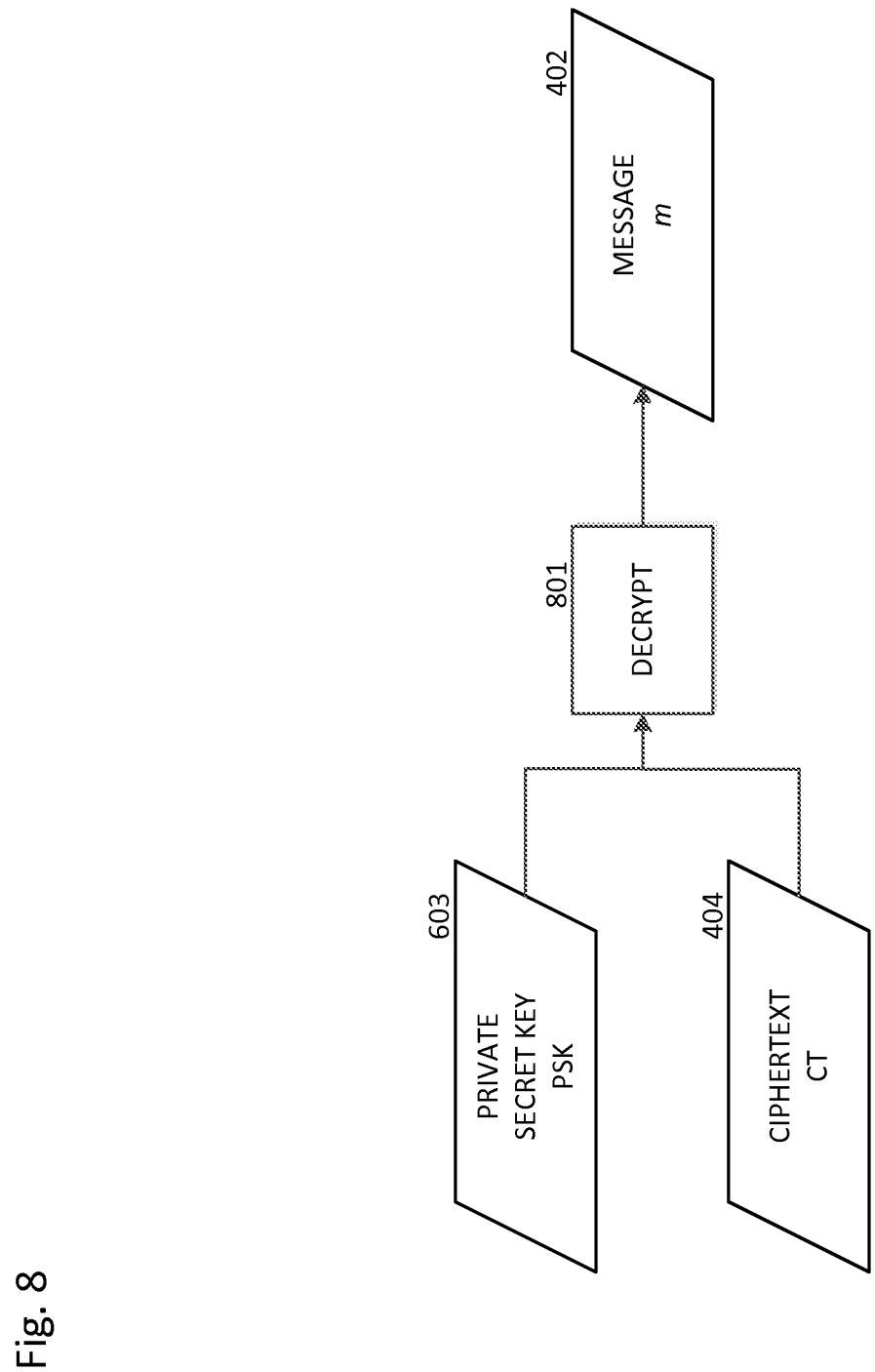
FIG. 8 illustrates an example data flow for a decryption module.

An overview of the inputs and outputs for the decryption module is illustrated in FIG. 8. The decryption module takes as input a private secret key PSK (603) in step 901 and at least a portion of the ciphertext CT (404) in step 902. While some embodiments of the decryption module may operate on a complete ciphertext, other embodiments may operate on a portion of a larger ciphertext. The module attempts to decrypt the ciphertext (404) using decrypt module (801) and outputs message m (402) if decryption is successful. If the decryption is not successful (for example, if the provided private secret key for decryption is incorrect, or the ciphertext does not contain w), it can output a special symbol ⊥, or an corresponding error message, and does not decrypt the ciphertext.

Figure 9:
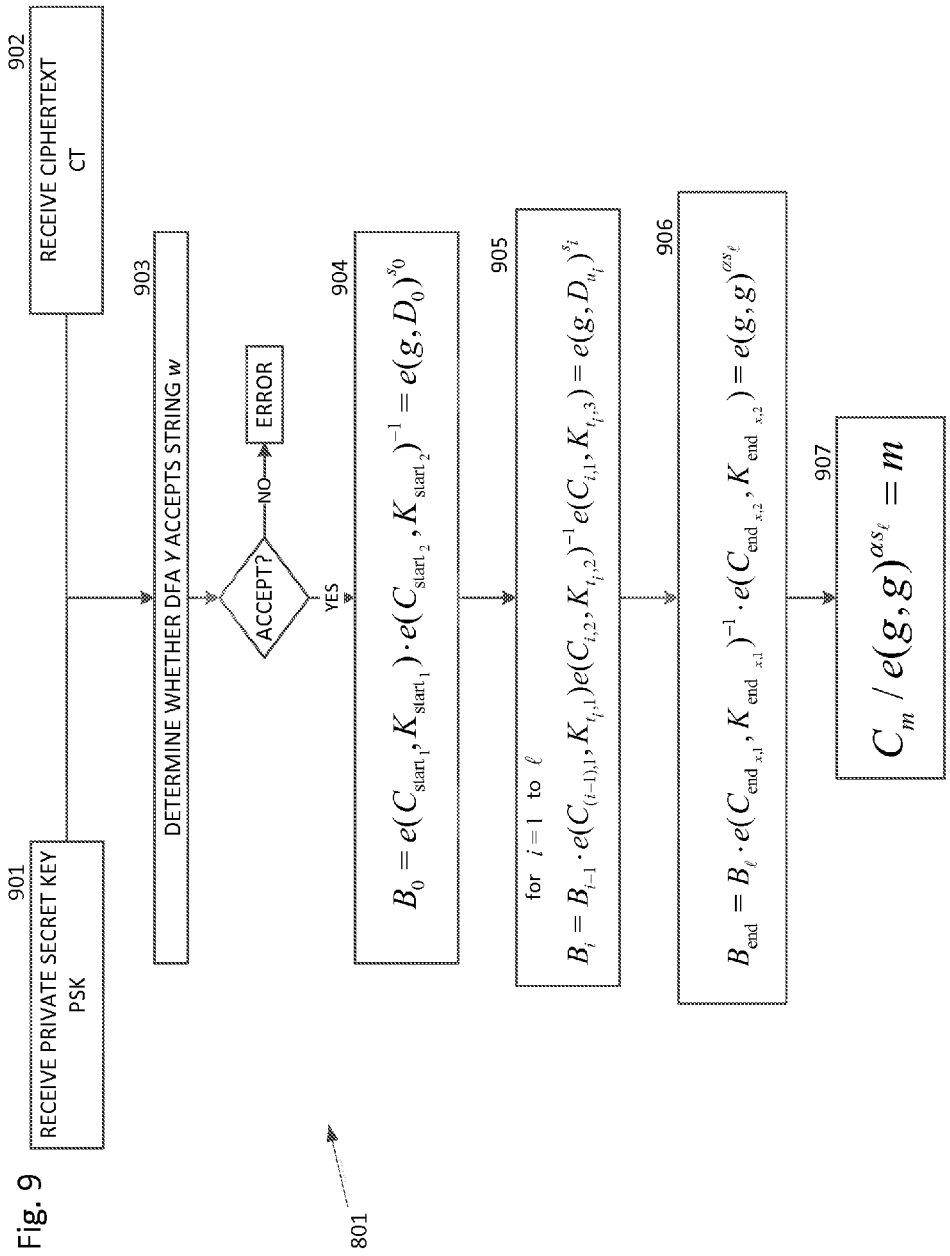
FIG. 9 illustrates an example method for decrypting a ciphertext.

An example decryption method is described below and illustrated in the flow diagram presented in FIG. 9. Assuming a ciphertext CT associated with a string $w=w_1$ and a private secret key PSK associated with a DFA $Y=(Q, \mathcal{T}, q_0, F)$ where ACCEPT (Y, w), then there exists a sequence of l+1 states $u_0$, $u_1, \ldots, u_l$ and l transitions $t_1, \ldots, t_l$ where $u_0=q_0$ and $u_l \in F$ and for i=1, ..., l there is $t_i=(u_{i-1}, u_i, w_i) \in \mathcal{T}$.

The method begins by parsing the description of the DFA Y from the private secret key PSK and parsing string w from the ciphertext CT. As discussed above, the private secret key PSK includes a representation of the specific DFA Y that was used in the generation of the PSK and the ciphertext CT includes the arbitrary string w. The method then processes the string w contained in the ciphertext CT according to the DFA Y to determine whether the DFA accepts the string w in step 903. The decryption processor then determines if ACCEPT (Y, w)=true. If the string w is not accepted, then an error is output and the ciphertext is not decrypted. An error can also be output in the event of other failures, such as the ciphertext not being well-formed.

As discussed above, the DFAs described herein can be used to evaluate an arbitrary input string according to a regular expression. In those embodiments, the encrypted message can be decrypted only if the arbitrary string in the ciphertext is in the set of strings represented by the regular expression associated with the private secret key for decryption being used. Because the regular expression defines a set of strings and not necessarily only a single string, there could be any number of different literal strings that would be accepted by the DFA and a corresponding regular expression processor. Thus, as a non-limiting example, the DFA could be specified to accept only one literal string, such as the four letters "HTTP" in that order. As another non-limiting example, the DFA could be specified to accept any pattern of characters in a .com domain name by specifying ".*\.com" where the first "." (period) means any character in that position, and the * (asterisk or star) matches the previous any character any number of times. The ".com" requires the literal presence of that character string, thereby excluding any other top level domains such as ".net." (The "\" is an escape character and is required to treat the "." as a literal period.) In that example, the DFA may accept thousands of different strings specifying various domain names.

If the string w is accepted, then the method continues by computing $$B_0 = e(C_{start_1}, K_{start_1}) \cdot e(C_{start_2}, K_{start_2})^{-1} = e(g, D_0)^{s_0}. \quad (904)$$

Then for i=1 to l it iteratively computes $$B_i = B_{i-1} \cdot e(C_{(i-1),1}, K_{t_i,1}) e(C_{i,2}, K_{t_i,2})^{-1} e(C_{i,1}, K_{t_i,3}) = e(g, D_{i_i})^{s_i} \quad (905)$$

If the DFA accepts the string w, then $u_l = q_x$ for some $q_x \in F$ and $B_l = e(g, D_x)^{s_l}$.

The processor then computes $$B_{end} = B_l \cdot e(C_{end_x,1}, K_{end_x,1})^{-1} \cdot e(C_{end_x,2}, K_{end_x,2}) = e(g,g)^{\alpha s_l}. \quad (906)$$

This value can then be divided from $C_m$ to recover the message m $$C_m / e(g,g)^{\alpha s_l} = m. \quad (907)$$

As discussed above, the function $e(g,g)^{\alpha s_l}$ is as an example function for blinding the message. By dividing $C_m$ by $B_{end}$, the message is unblinded. Other blinding functions could be used interchangeably.

As described above, the systems and methods described herein can be used to encrypt any arbitrary data types, such as strings, keys, and variable-length binary data. One example embodiment can use a secure symmetric encryption algorithm in a "hybrid encryption" mode, which combines symmetric encryption with the functional encryption systems and methods disclosed herein. A symmetric encryption algorithm uses a single key to both encrypt and decrypt data. Common symmetric algorithms include the Advanced Encryption Standard (AES), which is defined in NIST Publication FIPS-197. Other example symmetric algorithms include Triple-DES (NIST FIPS 46-3) and RC4 (designed by RSA Data Security) and a large number of alternative algorithms and ciphers.

In a hybrid encryption mode, the functional encryption systems and methods disclosed herein are used to encrypt cryptographic keys for the symmetric encryption scheme. These keys are in turn used to encrypt arbitrary-length data according to the symmetric encryption scheme. A first example embodiment performs hybrid encryption as follows: First, the encryptor generates a random symmetric key for an algorithm such as AES. The encryptor then encrypts the symmetric key by encoding it as an element of $\mathbb{G}_T$ using one of a number of standard encoding techniques. The resulting element is then encrypted using the functional encryption systems and methods disclosed herein. Finally, the variable-length input data is encrypted using the symmetric algorithm under the appropriate key. The resulting ciphertext hybrid includes the output of the functional encryption combined with the symmetrically encrypted ciphertext. This pair may be decrypted by inverting the functional encryption as described above, recovering the symmetric key using an appropriate decoding algorithm, and then decrypting the symmetrically-encrypted ciphertext using the recovered key. The steps of the encryption and decryption algorithms need not occur the specific order presented above.

In a second example hybrid embodiment, $e(g,g)^{\alpha s_l}$ could be hashed to create a symmetric (e.g., AES) key and then bulk data could be encrypted under that key. In that embodiment, in decryption $B_{end}$, as described above, would be computed and then hashed to derive the key which would be used to recover the bulk data.

A third example embodiment can be configured to use a modified form of functional encryption that supports key encapsulation. Key encapsulation is a form of encryption in which the generation of a symmetric key is incorporated into the encryption algorithm. This method does not require a plaintext message. The output can be a random symmetric key of a specified length, as well as the functional encryption of this key. Once the symmetric key has been generated, it can be used to encrypt arbitrary data and combined with the functional encryption ciphertext as in the previous embodiment.

Key encapsulation may be performed by modifying the functional encryption method described above to eliminate the element $m \cdot e(g,g)^{\alpha s_l}$ from the ciphertext. The systems and methods described herein can be configured to use a function for deriving keys known to one skilled in the art as a key derivation function. In these embodiments, while encryption is performed as in the original description above, the output of the key encapsulation encryption is computed by applying a key derivation function to the value $e(g,g)^{\alpha s_l}$ and outputting a pre-specified number of bits from this function. This key derivation function can include a standard cryptographic component known to one of ordinary skill in the art. The systems and methods described herein could be configured with any of many different algorithms for constructing such functions, the algorithm selection being based on different technologies, including as non-limiting examples, hash functions and block ciphers. The National Institutes of Standards and Technology (NIST) provide several recommendations for candidate key derivation functions in NIST Special Publication 800-108. As a further non-limiting example, a candidate key derivation function can be any function for deriving a fixed-size bit string from an arbitrary block of data, such as the SHA (NIST FIPS 180-2) cryptographic hash function. Numerous alternative candidate key derivation functions could be used.

A fourth example embodiment can be configured to use a single symmetric key and ciphertext generated according to the functional encryption systems and methods disclosed herein. This fourth embodiment can be used to encrypt a large number of distinct messages. The functional encryption ciphertext then forms a "lockbox" containing the key needed to decrypt any of the records. In this embodiment, the functional encryption ciphertext can be stored in a logically or physically separate location from each of the symmetric ciphertexts.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

Figure 10:
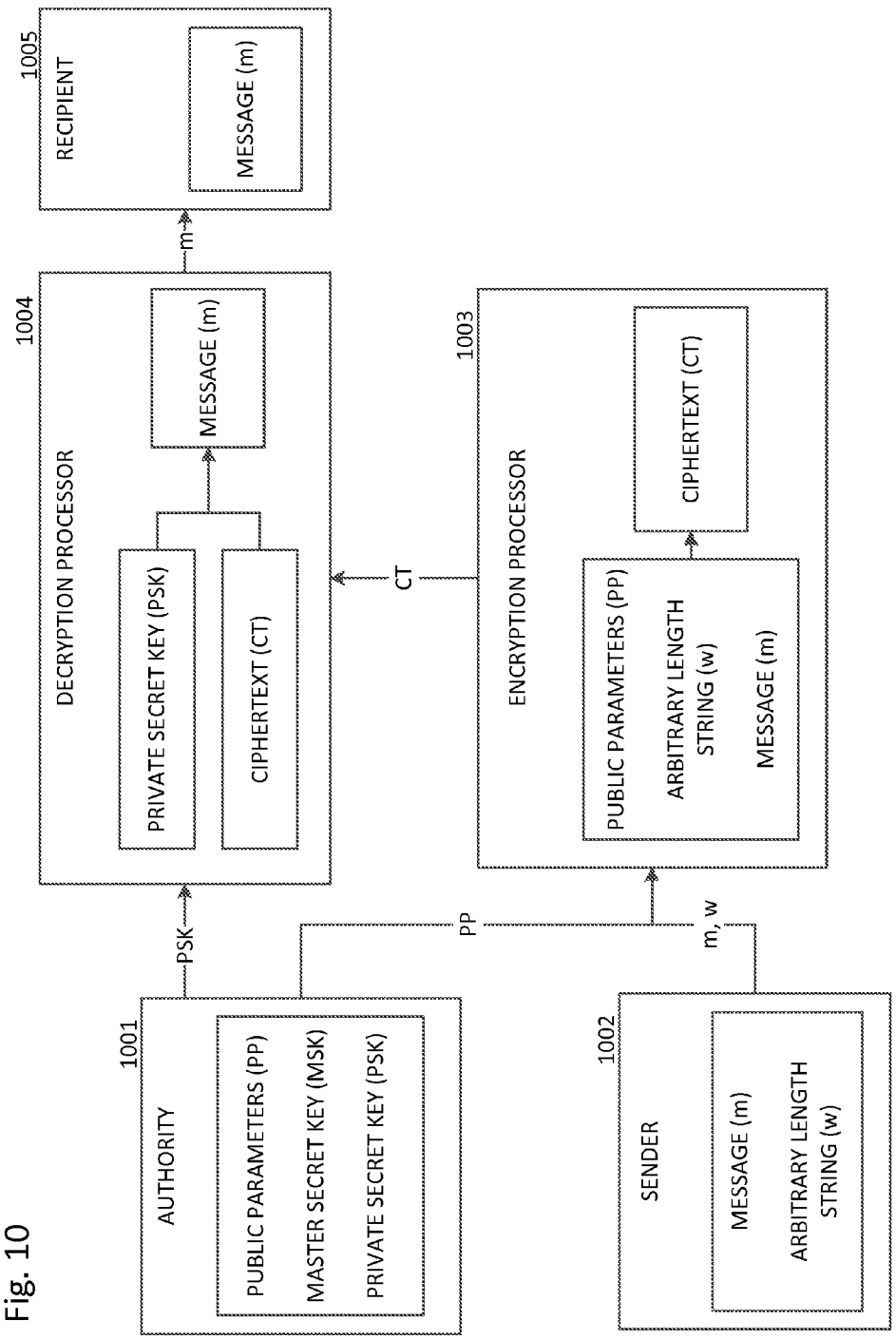
FIG. 10 illustrates an example system architecture for encryption and decryption.

An example logical system architecture for implementing the disclosed systems and methods is illustrated in FIG. 10. In the illustrated example, an authority (1001) can be used to store the public parameters, master secret keys, and private secret keys. The authority may also generate one or more of those values. The private secret key may be associated with a particular arbitrary deterministic finite automata. An encryption processor (1003) may receive the public parameters from authority (1001) and the unencrypted message and arbitrary string from sender (1002). In some embodiments, the encryption processor (1003) may be part of a computing device operated by sender (1002). The encryption processor (1003) can be configured to generate a ciphertext based on the public parameters, arbitrary string, and message.

A decryption processor (1004) may subsequently be used to decrypt the ciphertext. The decryption processor may or may not be part of a computing device operated by recipient (1005). The decryption processor (1004) can receive the ciphertext from the encryption processor (1003) or from any suitable permanent or temporary data store. In some embodiments, such as that depicted in FIG. 10, the decryption processor (1004) can be configured to request a corresponding private secret key from the authority (1001). Alternatively, the recipient (1005) may receive the private secret key from the authority, bypassing the decryption processor (1004). In that architecture, the recipient could provide both the ciphertext and the private secret key to the decryption processor (1004). In that embodiment, the private secret key may be stored on a persistent secure storage device accessible to the recipient, such as a smart card. The private secret key can then be used to decrypt the ciphertext if and only if the deterministic finite automata accepts the string incorporated into the ciphertext. If the deterministic finite automata accepts the string incorporated into the ciphertext, then the ciphertext can be decrypted and the original message provided to the recipient (1005). The master secret key could also be used to decrypt the ciphertext, although the recipient may not necessarily have access to the master secret key.

FIG. 10 illustrates a logical arrangement of system elements. In some embodiments, the illustrated system elements could be combined into a single hardware device or separated into multiple hardware devices. If multiple hardware devices are used, the hardware devices could be physically located proximate to or remotely from each other. While the description provided herein describes the use of a deterministic finite automata to determine the acceptance of the arbitrary string, other techniques could be used to determine acceptance of the string, as discussed above.

The methods can be implemented in a computer program product accessible from a computer-usable or computer-readable storage medium providing program code for use by or in connection with a computer or any instruction execution system. A computer-usable or computer-readable storage medium can be any apparatus that can contain or store the program for use by or in connection with the instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer having a display device such as a CRT (cathode ray tube), LCD (liquid crystal display), or other type of monitor for displaying information to the user and a keyboard and an input device, such as a mouse or a trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML etc., or a combination of programming languages, including compiled or interpreted languages, and it can be deployed in any form, including as a stand-alone program or as a module, component, subroutine, or other unit suitable for use in a computing environment. The software can include, but is not limited to firmware, resident software, microcode, etc. Protocols such as SOAP/HTTP may be used in implementing interfaces between programming modules. The components and functionality described herein may be implemented on any desktop operating system such as different versions of Microsoft Windows™, Apple™ Mac™, iOS™, Unix™/X-Windows™, Linux™, etc., executing in a virtualized or non-virtualized environment, using any programming language suitable for software development.

Suitable processors for the execution of a program of instructions include, by way of example, both general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform, or host. The virtual machine can have both virtual system hardware and guest operating system software.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

One or more embodiments of the invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a network.

While one or more embodiments of the present invention have been described, various alterations, additions, permutations and equivalents thereof are included within the scope of the invention.

What is claimed is:

1. A computerized method for decrypting a ciphertext using a master secret key and public parameters provided by an authority, comprising:
   receiving a ciphertext at a receiver module, wherein the ciphertext comprises:
      encrypted message material, the encryption having been performed based on one or more public parameters provided by an electronic key authority; and
      an unencrypted portion comprising a plaintext alphanumeric string of arbitrary length;
   receiving a private secret key at the receiver module, wherein the private secret key comprises:
      a transformation of one or more elements of a master secret key; and
      an alphanumeric string pattern acceptor associated with the private secret key and configured to accept only a predefined pattern of plaintext alphanumeric strings of arbitrary length, wherein the string pattern acceptor is a deterministic finite automata or a regular expression;
   determining with a decryption module if the plaintext alphanumeric string of the ciphertext matches the predefined pattern represented by the string pattern acceptor associated with and comprised by the private secret key by:
      parsing the ciphertext to obtain the plaintext alphanumeric string of the ciphertext;
      parsing the private secret key to obtain the string pattern acceptor of the private secret key;
      processing the plaintext string by applying the string pattern acceptor associated with and comprised by the private secret key to the string to determine if the string is accepted by the string pattern acceptor;
   decrypting the ciphertext with the decryption module by a transformative operation on the ciphertext if and only if the plaintext string of the ciphertext is accepted by the string pattern acceptor associated with and comprised by the private secret key; and
   storing the decrypted ciphertext in a computerized data storage device.

2. The method of claim 1, wherein the string pattern acceptor is a deterministic finite automata.

3. The method of claim 2, wherein the predefined pattern comprises a set of transitions between states in the deterministic finite automata, the states including at least a start state and an acceptance state.

4. The method of claim 2, wherein the deterministic finite automata is defined based on at least one rule defining a pattern for accepting a string of arbitrary length.

5. The method of claim 2, wherein the deterministic finite automata comprises a finite state machine defining state transitions for processing a regular expression, where for each pair of current state and input symbol there is one and only one transition to a next state.

6. The method of claim 5, further comprising converting the regular expression to the deterministic finite automata by a conversion module.

7. The method of claim 1, wherein the string pattern acceptor is a regular expression.

8. The method of claim 1, wherein the plaintext alphanumeric string is a member of a set having multiple alphanumeric strings each of which are represented in the private secret key.

9. The method of claim 1, wherein the transformative operation on the ciphertext for decryption comprises an exponentiation of one or more elements of the ciphertext by an integer.

10. The method of claim 1, further comprising receiving an identification of the plaintext alphanumeric string from a user and providing the identification to an encryption processor module to generate the ciphertext.

11. The method of claim 1, further comprising programmatically identifying the plaintext alphanumeric string using a regular expression.

12. The method of claim 1, wherein the plaintext alphanumeric string is contextually related to the encrypted message material.

13. A computerized method for encrypting and decrypting a message using a master secret key and public parameters provided by an authority, comprising:
receiving an input message for encryption at an electronic encryption module;
receiving one or more public parameters at the encryption module;
receiving a plaintext alphanumeric string at the encryption module, wherein the string is of arbitrary length;
encrypting the input message at the encryption module based on a transformative operation on the public parameters, the plaintext alphanumeric string, and the input message to generate an output ciphertext at the encryption module; and
storing the output ciphertext in a computerized data storage device,
receiving a private secret key at a decryption module, the private secret key comprising an alphanumeric string pattern acceptor associated with the private secret key and configured to accept only a predefined pattern of plaintext alphanumeric strings of arbitrary length, wherein the string pattern acceptor is a deterministic finite automata or a regular expression;
determining at the decryption module if the plaintext alphanumeric string of the ciphertext matches a predefined pattern represented by the string pattern acceptor associated with and comprised by the private secret key by:
parsing the output ciphertext to obtain the plaintext alphanumeric string of the ciphertext;
parsing the private secret key to obtain a string pattern acceptor of the private secret key;
processing the string by applying the string pattern acceptor associated with and comprised by the private secret key to the string to determine if the string is accepted by the string pattern acceptor;
decrypting ciphertext with a decryption module by a transformative operation on the ciphertext if and only if the plaintext string of the ciphertext is accepted by the string pattern acceptor associated with and comprised by the private secret key.

14. The computerized method of claim 13, further comprising generating a master secret key and the public parameters, wherein the master secret key and the public parameters are computed based on one or more randomized functions.

15. The computerized method of claim 13, further comprising:
selecting a random integer a as an exponent;
selecting a generator g from an algebraic group;
generating the public parameters by computing a bilinear map function based on $\alpha$ and g; and
generating the master secret key comprising the public parameters and an exponentiation of generator g by $\alpha$.

16. The computerized method of claim 13, wherein the plaintext string is identified by a user and is stored as a series of computer-readable characters on a computerized data storage device.

17. The computerized method of claim 13, wherein the plaintext string is identified by an automatic process and is stored as a series of computer-readable characters on a computerized data storage device.

18. The computerized method of claim 13, further comprising encrypting the input message using an exponentiation of at least one of the public parameters.

19. The computerized method of claim 13, wherein the input message for encryption is a cryptographic key for a symmetric encryption scheme, and further comprising encrypting data using the cryptographic key for the symmetric encryption scheme.

20. The computerized method of claim 19, further comprising encoding the cryptographic key for the symmetric encryption scheme as an element of an algebraic group.

21. The computerized method of claim 13, further comprising generating the private secret key for decrypting the output ciphertext, wherein the private secret key comprises the string pattern acceptor that must be satisfied by the plaintext string in the output ciphertext for decryption.

22. The computerized method of claim 21, wherein the string pattern acceptor of the private secret key comprises a regular expression.

23. The computerized method of claim 13, further comprising:
generating the private secret key for decrypting the output ciphertext, wherein the private secret key comprises the string pattern acceptor, the string pattern acceptor including a deterministic finite automata, and
wherein decryption requires that the plaintext string in the output ciphertext is accepted by the deterministic finite automata.

24. The computerized method of claim 13, further comprising:
computing a key derivation function based on the one or more public parameters;
defining the result of the key derivation function as the input message for encryption; and
encrypting data using a symmetric encryption scheme having the result of the key derivation function as a cryptographic key.

25. A system for secure message processing using a master secret key and public parameters provided by an authority, the system comprising:
- an encryption module configured for:
  - receiving an input message for encryption;
  - receiving one or more public parameters;
  - receiving a plaintext alphanumeric string, wherein the plaintext string is of arbitrary length;
  - encrypting the input message using the results of a transformative operation on the public parameters to generate encrypted message material;
  - appending the received plaintext string to the encrypted message material to generate an output ciphertext;
- a data storage module configured for storing the output ciphertext in a computerized data storage device; and
- a decryption module configured for:
  - receiving the output ciphertext;
  - receiving a private secret key, wherein the private secret key comprises:
    - a transformation of one or more elements of a master secret key; and
    - an alphanumeric string pattern acceptor associated with the private secret key and configured to accept only a predefined pattern of plaintext alphanumeric strings of arbitrary length, wherein the string pattern acceptor is a deterministic finite automata or a regular expression;
  - determining if the plaintext alphanumeric string of the output ciphertext matches the predefined pattern represented by the string pattern acceptor associated with and comprised by the private secret key by:
    - parsing the output ciphertext to obtain the plaintext alphanumeric string of the ciphertext;
    - parsing the private secret key to obtain the string pattern acceptor of the private secret key;
    - processing the plaintext string by applying the string pattern acceptor associated with and comprised by the private secret key to the string to determine if the string is accepted by the string pattern acceptor;
  - decrypting the output ciphertext with the decryption module by a transformative operation on the output ciphertext if and only if the plaintext string of the ciphertext is accepted by the string pattern acceptor associated with and comprised by the private secret key.

26. The method of claim 25, wherein the string pattern acceptor is a regular expression.

27. The method of claim 25, wherein the string pattern acceptor is a deterministic finite automata, and wherein the predefined pattern comprises a set of transitions between states in the deterministic finite automata, the states including at least a start state and an acceptance state.

28. The system of claim 25, further comprising a setup module configured for generating the master secret key and the public parameters, wherein the master secret key and the public parameters are computed based on one or more randomized functions of the setup module.

29. The system of claim 25, wherein the setup module is further configured for:
- selecting a random integer a as an exponent;
- selecting a generator g from an algebraic group;
- generating the public parameters by computing a bilinear map function based on $\alpha$ and g; and
- generating the master secret key comprising the public parameters and an exponentiation of generator g by $\alpha$.

30. The system of claim 25, further comprising:
- a private secret key generation module configured for:
  - receiving the master secret key;
  - receiving the alphanumeric string pattern acceptor from a user;
  - generating the private secret key based on a transformative operation on the master secret key and the alphanumeric string pattern acceptor.

* * * * *